Figure 1:
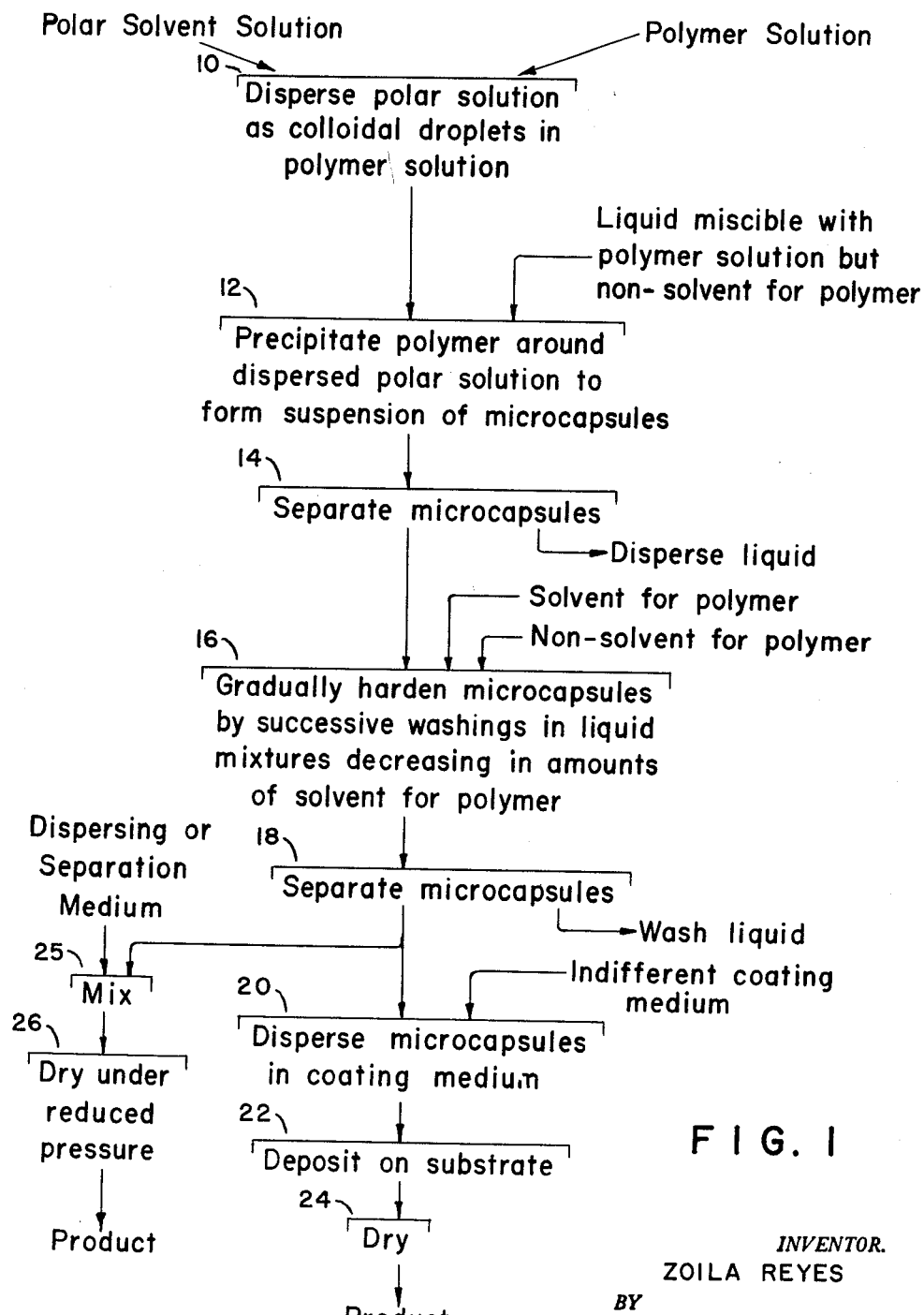

March 16, 1965

Z. REYES 3,173,878

PROCESS OF MAKING MICROCAPSULES

Filed Feb. 26, 1960

INVENTOR.
ZOILA REYES
BY
Flehr & Swain
ATTORNEYS 3,173,878
PROCESS OF MAKING MICROCAPSULES
Zoila Reyes, Menlo Park, Calif., assignor, by mesne assignments, to International Business Machines Corporation, New York, N.Y., a corporation of New York
Filed Feb. 26, 1960, Ser. No. 11,286
7 Claims. (Cl. 252—316)

This invention relates to microcapsules and to methods of making the same.

In copending application Serial No. 11,341, filed February 26, 1960, I have disclosed a process by which a substrate such as a chemically treated paper can be coated with polymeric microcapsules containing a dye component, marking material, or other chemical reactive with the paper. The process therein disclosed employs hydrophobic polymers in forming the walls of the microcapsules, to produce relatively high-strength nonporous polmeric microcapsules.

In general, it is an object of the present invention to improve upon processes of this type, and particularly with respect to a procedure by which the encapsulating material can be rapidly and effectively insolubilized and hardened.

Another object of the invention is to provide a method of this character for producing microcapsules dispersed in a desired coating medium, suitable for deposit on a substrate.

It is a further object to provide a method of producing microcapsules in outwardly dried form, either as a thin film-like coating on a substrate or as isolated units.

Other objects of the invention will appear from the following description and from the drawing in which:

The single figure is a flow sheet outlining the preferred procedure for carrying out the invention.

In accordance with the present invention, polymeric microcapsules are produced by first creating a dispersion of an aqueous or other polar solvent solution in a solution of the hydrophobic encapsulating polymer in a nonaqueous nonpolar solvent liquid. The polar or aqueous solution is present in the form of colloidal droplets which constitute the dispersed phase, with the solution of the polymer constituting the continuous phase. Upon adding a second nonaqueous nonpolar liquid miscible with the polymer solution but in which the polymer is itself insoluble, the polymer is caused to precipitate around the droplets of the aqueous or polar solvent solution to form polymeric microcapsules. These microcapsules are suspended as tiny polymeric bodies in an equilibrium mixture of the added liquid and the continuous phase liquid.

The microcapsules are separated and gradually insolubilized and hardened by washing with successive liquid mixtures, each comprising intermixed solvent and nonsolvent for the polymer. Hardening is accomplished by gradually decreasing the amount of solvent in each successive washing. The hardened microcapsules can be separated and dispersed in an indifferent coating medium for deposit on a substrate, which thereafter can be dried to produce a finished product. Alternatively, the hardened microcapsules can be mixed with a dispersing or separation medium for drying, preferably under reduced pressure, to produce isolated microcapsules.

In accordance with the procedure shown in the drawing, the ingredient to be encapsulated is in the form of an aqueous or polar solvent solution. This solution, which may comprise an aqueous solution of a chemical reagent such as a dye component, marking material, etc. is dispersed in step 10 in a liquid solution of the encapsulating polymer which comprises the continuous phase of the dispersion. Where the dispersion is in the form of an emulsion a suitable emulsification agent may be advantageously employed. Preferably the continuous phase is composed of a nonaqueous solvent, such as an organic solvent, which is immiscible with the polar solvent. The polymer of the continuous phase is caused to precipitate around the dispersed droplets of the aqueous or polar solvent solution through the addition of a second nonaqueous nonpolar liquid in which the polymer is insoluble. Precipitation in this manner results in a profusion of tiny microcapsules consisting of the aqueous or polar solvent solution as a core and the precipitated polymer as a protective shell.

In step 14, the microcapsules may be separated or partially separated, with recovery of continuous phase liquid for reuse. Such separation may be by filtration at low filtration pressures or by decanting excess equilibrium liquid or by any other suitable procedure.

The insolubilizing and hardening of the microcapsules in step 16 is carried out by successive contact with liquid mixtures decreasing in solvent capacity for the encapsulating polymer. By way of illustration, the equilibrium liquid withdrawn from step 14 can be mixed with additional nonsolvent liquid of the type added in step 12, and the microcapsules washed with this mixture containing an increased proportion of nonsolvent. The wash liquid from this operation can be mixed with additional nonsolvent liquid for a successive wash operation, with such procedure being repeated until the microcapsules are sufficiently insolubilized. In the alternative separate wash mixtures, each comprising a predetermined quantity of solvent and nonsolvent for the polymyer, can be employed in successive wash operations.

The microcapsules may again be separated in step 18 for subsequent dispersion in a desired coating medium (step 20) and deposit on a substrate (step 22). The resulting product is a substrate, such as paper, plastic, cloth, glass, etc., coated with a profusion of the solution-filled microcapsules, which upon being dried in step 24 produces a final coated product. As will appear, the solution contained within the microcapsules can be reactive with the coating on the substrate, so that upon application of pressure to break the microcapsules, a desired reaction (e.g. dye formation) can occur.

Instead of dispersing the microcapsules in a coating medium, they may be dispersed in a suitable dispersing or separation medium, such as a mineral oil, in step 25. Upon drying under reduced pressure in step 26, a product comprising isolated polymeric microcapsules can be obtained. Such product may be in the form of myriads of tiny capsules, having the appearance and feel of a fine, dry powder, although containing up to 85% of polar solution. It will be understood that the solution within the microcapsules is protected from air contamination, being released only when the shell of the microcapsule is crushed or dissolved.

A "polar solvent solution" or aqueous solution as defined for use in the present invention is any solution in a polar solvent, such as water, wherein the molecular structure of the solvent is based on an electrostatic or polar bond (as opposed to a covalent bond). As is well known, such molecular constructions if placed between electrically charged plates tend to rotate so as to present a positive end to the negative plate and vice versa. Specifically the term polar solution is intended to include aqueous solutions or dispersions of materials such as dye components, chemical reagents, adhesives and the like, or such ingredients dissolved or dispersed in other polar solvents such as dilute alkali or acid, or solutions of reactive ingredients in such solvents as a solution of one or more components of a dye process (e.g., diazo process).

By "polymerized material" is meant any hydrophobic polymeric compound capable of being dissolved or emulsified in the nonpolar solvent forming the continuous phase, and having desired characteristics as an encapsulating material. Preferred polymers are those which possess excellent chemical and water resistance and dimensional stability, which are heat stable, and which retain suitable flexibility and toughness upon variation in temperature. Examples of suitable polymers include those based on cellulose such as ethyl cellulose, cellulose nitrate, cellulose acetate-butyrate and other mixed and higher esters of cellulose. Polystyrene and polystyrene copolymers (hydrophobic) can also be satisfactorily employed, likewise vinyl acetate-vinyl chloride copolymers, polyvinyl chloride, polyvinylidene chloride, polyethylene, polypropylene, polybutene, polyisobutylene, and natural and synthetic rubbers, polyvinyl fluoride, polyesters such as styrenated polyesters, resins such as alkyd resins and blends of these polymers and resins. Ethyl cellulose is particularly satisfactory because of its high solubility in inexpensive solvents (e.g., chlorinated hydrocarbons such as carbon tetrachloride and methylene chloride, or aromatic hydrocarbons such as benzene xylene, etc.), its extensive compatibility, and its stability to light, heat and chemical action by acids and bases.

The nonaqueous nonpolar solvent liquid used as the continuous dispersant should be immiscible with the dispersed polar or aqueous solution and a good solvent for the encapsulating polymer. Preferred nonpolar liquids are immiscible with water and good solvents for the preferred polymers such as ethyl cellulose, although this last characteristic is of course not essential to all systems of the invention. By way of illustration, suitable nonaqueous nonpolar solvents include various chlorinated hydrocarbons and aromatic solvents, as mentioned above, or mixtures of such solvents (e.g., xylene and carbon tetrachloride). It will be understood that the particular nonpolar solvent selected will depend upon the particular disperson system, including the polar solution being encapsulated.

The nonpolar nonaqueous liquid added to insolubilize and precipitate the polymer should be compatible with and fully miscible with the dispersant liquid. Preferred liquids, where cellulose polymers are employed, include the readily available petroleum distillates such as petroleum ether and the higher boiling mineral fractions (e.g., petroleum aliphatic solvents, boiling between about 120° to 170° C.). Where a polymer such as polystyrene is employed, an aliphatic solvent such as cyclohexane may be employed. Again the particular nonpolar liquid selected will depend upon the characteristics of the initial dispersion and particularly the polymeric material employed for encapsulation purposes.

As previously indicated, the solvent-nonsolvent mixtures employed in step 16 may be composed of the liquids previously used in the steps 12 and 14. By way of illustration, assuming dispersion in step 10 in a polymer solution comprising ethyl cellulose dissolved in toluene, and the use of petroleum ether in step 12 to precipitate the polymer, the solvent and nonsolvent mixture in step 16 might comprise a mixture of toluene and petroleum ether. Successive washings would be by mixtures decreasing in the amount of toluene and increasing in the amount of petroleum ether. Alternatively, mixtures independent of the original process may be employed, for example, xylene mixed with petroleum ether.

Specific examples of my process are as follows:

*Example 1*

A polar solution is prepared having the following composition in parts by weight:

1.5 of 4-dimethyl-aminobenzene diazonium chloride-zinc chloride double salt
1.0 of zinc chloride
2.0 of citric acid
2.0 of thiourea
93.5 of water
―――
100.0

This solution is dispersed in a 5% solution of ethyl cellulose in toluene. I employed 48% ethoxyl polymer sold under the trade designation "Hercules N–100" and manufactured by the Hercules Powder Company. The weight ratio of aqueous solution to polymer in the dispersion is 5:1, 1% of sorbitan sesquioleate (Arlacel C, Atlas Powder Company), on the weight of the dispersion, being used as emulsifying agent. Upon the slow addition of petroleum ether (65–110° C.), the polymer is precipitated about the dispersed aqueous solution to form a profusion of the tiny polymeric microcapsules (0.5 to 5 microns). After stirring and cooling to about 15° C., the microcapsules are separated from the equilibrium liquid by decantation and are hardened by gradual and progressive insolubilization of the ethyl cellulose by washing with petroleum ether containing decreasing amounts of toluene. The hardened microcapsules are separated from the final wash mixture by filtration and dispersed in a coating medium comprising an emulsion of an alkaline solution of a naphthol coupler, and the coating medium applied to paper. Upon drying, the resulting dry paper can be imprinted by application of a pressure image to rupture the microcapsules, causing release of the diazonium salt at the point of the pressure application.

*Example 2*

A polar solution is prepared in parts by weight as follows:

1.0 of p-diazodimethylaniline-zinc chloride double salt
38.5 of ethylene glycol
2.5 of citric acid
5.0 of water
1.0 of nonionic Ethofat 60/15 (to aid in emulsification)
―――
48.0

This solution is encapsulated in ethyl cellulose employing the procedure of Example 1, in weight ratio of 4 to 1. The microcapsules are separated from the equilibrium liquid by decantation and are suspended in an amount of mineral oil containing petroleum ether (B.P. 65–110° C.) and xylene just sufficient to cover the microcapsules. The ratio of petroleum ether to xylene is 3 to 2. The xylene and petroleum ether are gradually removed from the suspension by evaporation under reduced pressure (e.g. 20 mm. of Hg) in a Rinco evaporator. Polymeric microcapsules remain suspended in the mineral oil as tiny aggregates and isolated units.

*Example 3*

A polar solution is prepared having the following composition in parts by weight:

0.4 of phloroglucinol dihydrate
3.0 of sodium acetate trihydrate
3.0 of urea
20.0 of polyethylene glycol 400
23.6 of water This solution is dispersed in a 5% solution of ethyl cellulose in xylene. The weight ratio of polar solution to polymer solution is 2 to 1. Additional dispersions are similarly prepared employing weight ratios of 3 to 1, 4 to 1, and 5 to 1. Polymeric microcapsules are formed in each of the dispersions by the slow addition of petroleum ether, in the manner of Example 1. The microcapsules are separated from the equilibrium mixtures in each case and hardened by washing with petroleum ether-xylene mixtures containing decreasing amounts of xylene.

Example 4

The following solution is prepared in parts by weight:

1.0 of Borax
1.4 of trisodium phosphate
25.0 of polyethylene glycol 400
72.6 of water 100.0

This solution is emulsified in 400 parts of 5% ethyl cellulose in xylene-carbon tetrachloride (1:1 by weight). 1% of a finely divided solidified castor oil derivative (Thixcin R, Baker Castor Oil Co.) is used as emulsifying agent (e.g. 1% on the weight of the aqueous solution). The emulsion is diluted with carbon tetrachloride to 2½% with respect to ethyl cellulose. Thereafter a slow addition of petroleum ether (65–110° C.) with stirring, causes gradual precipitation of ethyl cellulose on the droplets of the aqueous solution, trapping and encapsulating them. The microcapsule suspension obtained is cooled with simultaneous agitation at 15° C., and allowed to settle. The equilibrium liquid is decanted and replaced by an equal volume of a 1:1.5 mixture (by weight) of carbon tetrachloride to petroleum ether (65–110° C.). After agitation at room temperature for 15 minutes, the microcapsule suspension is allowed to settle and the liquid decanted. The procedure is repeated using mixtures of carbon tetrachloride-petroleum ether of 1:3 and 1:5. The wet capsules are then stirred into two volumes of petroleum ether (35–60° C.) containing 2 parts of a microcrystalline wax (e.g. Multiwax W-445, Petroleum Specialties, Inc.). After standing overnight at room temperature, the capsules are filtered and air dried.

The resulting microcapsules may be dispersed in a coating medium such as a solution of maleic rosin ester (e.g. Amberol 806, Rohm & Haas Co.) in petroleum naphtha or mineral thinner, and coated on ozalid type diazo paper or plain paper. Coating on diazo paper produces a self-developing diazo paper, upon which marks can be made by a simple application of pressure. The plain coated paper may be used to print on ozalid paper.

Example 5

The following solution is prepared in parts by weight:

0.6 of phloroglucinol dihydrate
4.5 of sodium acetate trihydrate
4.5 of urea
30.0 of polyethylene glycol 400
60.4 of water 100.00

The solution is emulsified in 400 parts of 5% ethyl cellulose in a xylene-carbon tetrachloride mixture (1:1 by weight), which contains 2 parts of cetyl alcohol and 0.01 part of an optical bleach (e.g. Tinopal E. Geigy Chemical Co.). Petroleum ether (65–110° C.) is added gradually with sufficient agitation to precipitate the ethyl cellulose on the internal phase of the emulsion, forming microcapsules. After agitation at room temperature for approximately 30 minutes, the suspension is allowed to settle. The equilibrium liquid is decanted and replaced by an equal volume of a 1:1.5 mixture (by weight) of carbon tetrachloride to petroleum ether (65–110° C.). After agitation at room temperature for about 15 minutes, the microcapsule suspension is allowed to settle and the liquid decanted. The procedure is repeated using mixtures of carbon tetrachloride petroleum ether in proportions of 1:3, and 1:5 respectively. The wet capsules can now be dispersed in two volumes of petroleum ether (35–60° C.), filtered and dried. They may also be dispersed in a suitable carrier for coating on paper.

Papers coated with this product may be used to print on diazo coated papers (papers sensitized with a stabilized diazonium salt).

I claim:

1. In a process of producing polymeric microcapsules containing aqueous solution, the steps of dispersing such solution in a nonaqueous nonpolar solvent liquid containing dissolved hydrophobic polymerized material, adding a nonaqueous nonpolar liquid in which said polymerized material is insoluble, said last named step causing said polymerized material to insolubilize and precipitate about dispersed droplets of aqueous solution to form polymeric microcapsules, and gradually insolubilizing and hardening said microcapsules by successive washings with mixtures of said nonaqueous nonpolar solvent and nonaqueous nonpolar insolubilizing liquid decreasing in solvent capacity with respect to said polymerized material.

2. A process as in claim 1 wherein said microcapsules are dried under reduced pressure after they have been washed.

3. In a process of producing polymeric microcapsules containing aqueous solution, the steps of dispersing such solution in a first nonaqueous nonpolar solvent liquid containing dissolved hydrophobic polymerized material, adding a second nonaqueous nonpolar liquid in which said polymerized material is insoluble to induce insolubilization and precipitation of said polymerized material about dispersed droplets of aqueous solution to produce polymeric microcapsules, said microcapsules being suspended in a mixture of said nonaqueous nonpolar liquids, removing excess of the liquid mixture, contacting said microcapsules with a further mixture of said nonaqueous nonpolar liquids containing a decreased amount of the first solvent liquid and repeating said last named step with liquid mixtures containing progressively decreasing amounts of said first solvent liquid, whereby the precipitated polymerized material is gradually insolubilized and hardened.

4. A process as in claim 3 wherein the microcapsules are separated from the contacting liquid mixtures and dried.

5. In a process of producing polymeric microcapsules containing aqueous solution, the steps of dispersing such solution as colloidal droplets in a first nonaqueous nonpolar solvent liquid containing dissolved hydrophobic polymerized material, said aqueous solution and nonaqueous nonpolar solvent liquid being substantially immiscible, adding a second nonaqueous nonpolar liquid in which said polymerized material is insoluble, said polymerized material precipitating around said colloidal droplets to produce polymeric microcapsules, and gradually insolubilizing the polymerized material forming said microcapsules by successive washings with mixtures of said first and second liquids containing decreasing amounts of the first solvent liquid.

6. A process of producing polymeric microcapsules containing an aqueous solution comprising the steps of dispersing such solution in the form of colloidal droplets in a first nonaqueous nonpolar solvent liquid containing dissolved hydrophobic polymerized material, said aqueous solution and nonaqueous nonpolar solvent liquid being substantially immiscible, adding to said dispersion a second nonaqueous nonpolar liquid in which said polymerized material is insoluble, said polymerized material being caused to insolubilize and precipitate around said dispersed colloidal droplets to form polymeric microcapsules suspended in a mixture of said first and second liquids, separating said microcapsules from excess liquid mixture by decantation, contacting said microcapsules with a second mixture of nonaqueous nonpolar liquids, one of which is and the other of which is not a solvent for said polymerized material, said microcapsules being less soluble in said second liquid mixture than in said first liquid mixture, and repeating the contacting step with further mixtures of nonaqueous nonpolar liquids containing decreasing amounts of a nonaqueous nonpolar solvent for the polymerized material, whereby said microcapsules are gradually insolubilized and hardened, and separating said microcapsules from the last of said solvent mixtures.

7. A process of making microcapsules which comprises producing a dispersion in which colloidal droplets of an aqueous polar solvent solution constitute the dispersed phase and nonaqueous nonpolar liquid substantially immiscible with said aqueous polar solvent solution constitutes the continuous phase, said continuous phase liquid having a hydrophobic polymerized material dissolved therein, adding a second nonaqueous nonpolar liquid which is miscible with said continuous phase but in which said polymerized material is insoluble to thereby insolubilize and precipitate said polymerized material about said colloidal droplets to form polymeric microcapsules, and gradually insolubilizing and hardening said microcapsules by successive washings with nonaqueous nonpolar liquid mixtures decreasing in solvent capacity with respect to said polymerized material.

References Cited in the file of this patent

UNITED STATES PATENTS 2,800,458    Green _____ July 23, 1957

OTHER REFERENCES

Dobry et al.: "Phase Separation in Polymer Solution," Journal of Polymer Science, vol. 2, No. 1 (1947), pages 90–100.